United States Patent [19]

Ohhashi

[11] Patent Number: 4,862,391

[45] Date of Patent: Aug. 29, 1989

[54] SHADING CIRCUIT FOR SHADING A PLURALITY OF POLYGONS WHICH CONSTITUTE A SOLID MODEL, AND METHOD OF SHADING THE SAME

[75] Inventor: Masahide Ohhashi, Yokohama, Japan

[73] Assignee: Kabushiki Kaisha Toshiba, Kawasaki, Japan

[21] Appl. No.: 101,980

[22] Filed: Sep. 28, 1987

[30] Foreign Application Priority Data

Sep. 29, 1986 [JP] Japan .................................. 61-227980

[51] Int. Cl.$^4$ ............................................... G09G 1/06
[52] U.S. Cl. ..................................... 364/522; 340/729; 340/742
[58] Field of Search ............... 364/518, 520, 521, 522; 340/709, 723, 725, 720, 729, 728, 748, 750; 358/101, 133, 136

[56] References Cited

U.S. PATENT DOCUMENTS

| | | | |
|---|---|---|---|
| 3,996,673 | 12/1976 | Vorst et al. | 340/742 X |
| 4,163,257 | 7/1979 | White | 358/133 |
| 4,278,996 | 7/1981 | Netrauali et al. | 358/136 |
| 4,396,903 | 8/1983 | Habicht et al. | 358/96 X |
| 4,586,038 | 4/1986 | Sims et al. | 340/729 |
| 4,727,364 | 2/1988 | Vorst | 340/729 |

OTHER PUBLICATIONS

Foley et al., "Fundamentals of Interactive Computer Graphics," Addison-Wesley Publishing Company, Chapter 16 Shading Models 16.4, pp. 582–583.

Primary Examiner—A. D. Pellinen
Assistant Examiner—A. Jonathan Wysocki
Attorney, Agent, or Firm—Finnegan, Henderson, Farabow, Garrett & Dunner

[57] ABSTRACT

A shading circuit has a unit for calculating coordinates and intensities of points inside a polygon based on X, Y, and Z coordinates and intensities of vertexes of each of polygons constituting a solid model. This unit includes a preprocessing section for obtaining the depth change $\Delta Z/\Delta X$ of Z coordinate for each unit change in X coordinate and the change $\Delta I/\Delta X$ of intensity for each unit change in X coordinate, based on X, Y, and Z coordinates and intensities of three vertexes of each of triangular polygons constituting a solid model, and a digital differential analyzer until for obtaining Z coordinates and intensities of points inside each polygon commonly using $\Delta Z/\Delta X$ and $\Delta I/\Delta X$ when the X and Y coordinates of the points are determined.

10 Claims, 7 Drawing Sheets

SHADING CIRCUIT FOR SHADING A PLURALITY OF POLYGONS WHICH CONSTITUTE A SOLID MODEL, AND METHOD OF SHADING THE SAME

BACKGROUND OF THE INVENTION

The present invention relates to a graphic processing system for graphically synthesizing a solid model, and more particularly, to a shading circuit for shading a plurality of polygons which constitute a solid model to be displayed on a display screen.

In the fields of machine design and body design of vehicles, a graphic processing system is used for graphically synthesizing a solid model. The solid model is synthesized by combining various types of polygons. For example, a complex curved surface of a vehicle body is approximated by a large number of polygons which are defined such that a plurality of points on the curved surface are designated and are connected. For example, when a perspective solid mode is required, only the outlines of polygons are displayed. When the solid model is required to be more substantiated, the surfaces of polygons on the front side are shaded on a screen assuming that the solid model is illuminated with light.

Figure 1:
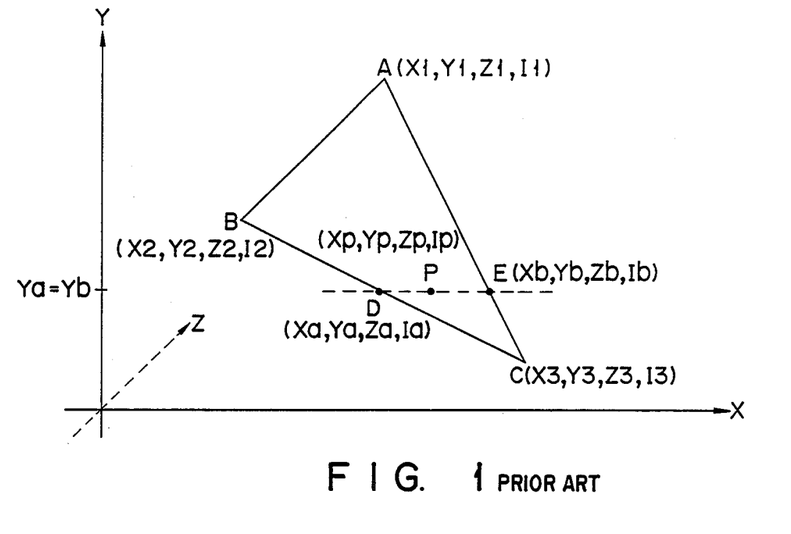
FIG. 1 is a view for explaining conventional Gouraud shading.

As one of conventional shading techniques, Gouraud shading is known. In the Gouraud shading, vertex data of a plurality of items are prepared for each of polygons constituting a solid mode. Each vertex data represents a three-dimensional position and an intensity (or a luminance) of one of the vertexes of a polygon. The vertex position is defined by coordinates on three orthogonal coordinate axes, e.g., coordinate axes, X, Y, and Z. For example, if a polygon is a triangle, as shown in FIG. 1, vertex data $(x1,y1,z1,I1)$, $(x2,y2,z2,I2)$, and $(x3,y3,z3,I3)$ are prepared for vertexes A, B, and C. $(x1,y1,z1)$, $x2,y2,z2)$, and $(x3,y3,z3)$ are three-dimensional coordinates of vertexes A, B, and C, and I1, I2, and I3 are intensities of vertexes A, B, and C, respectively.

In the display screen, coordinate axes X, Y, and Z respectively extend in the horizontal, vertical, and depth directions. The vertex data are subjected to arithmetic operations necessary for shading the polygon along scan lines on the display screen. In the arithmetic operations, intensities and Z coordinates of points inside the polygon, which are along the scan lines are obtained. The intensity of each point is used to determine the intensity of the pixel corresponding to this point. The Z coordinate each point is used to confirm that this point is located in front of a point of another polygon to be displayed on the screen. The scan lines of the display are set to be parallel to coordinate axis X. A broken line in FIG. 1 is one of the scan lines. The intensities and Z coordinates of points inside the triangular polygon, which are along this scan line, are obtained as follows. In FIG. 1, $(Xa,Ya,Za,Ia)$ and $(Xb,Yb,Z,Ib)$ represent coordinates and intensities at positions where the scan line intersects two points on the polygon edges, i.e., points D and E. Intensity Ia and Z coordinate Za of point D are obtained by interpolating intensity values I2 and I3 and Z coordinate values z2 and z3, respectively, based on the Y coordinate values of points B, D, and C. Intensity Ib and Z coordinate Zb of point E can be obtained by interpolating intensity values I1 and I3 and Z coordinate values z1 and z3, respectively, based on the Y coordinate values of points A, E, and C. $(Xp,Yp,Zp,Ip)$ represent a coordinate and an intensity of arbitrary point P between points D and E. Intensity Ip and Z coordinate Zp of point P can be obtained by interpolating intensity values Ia and Ib and Z coordinate values Za and Zb, respectively, based on the X coordinate values of points D, P, and E. More specifically, Ia, Ib, Ip, Za, Zb, and Zp can be given by the following equations:

$$Ia = I2\{(Ya-Y3)/(Y2-Y3)\} + I3\{(Y2-Ya)/(Y2-Y3)\} \quad (1)$$

$$Ib = I1\{(Yb-Y3)/(Y1-Y3)\} + I3\{(Y1-Yb)/(Y1-Y3)\} \quad (2)$$

$$Ip = Ia\{(Xp-Xb)/(Xa-Xb)\} + Ib\{(Xa-Xp)/(Xa-Xb)\} \quad (3)$$

$$Za = Z2\{(Ya-Y3)/(Y2-Y3)\} + Z3\{(Y2-Ya)/(Y2-Y3)\} \quad (4)$$

$$Zb = Z1\{(Yb-Y3)/(Y1-Y3)\} + Z3\{(Y1-Yb)/(Y1-Y3)\} \quad (5)$$

$$Zp = Za\{(Xp-Xb)/(Xa-Xb)\} + Zb\{(Xa-Xp)/(Xa-Xb)\} \quad (6)$$

In the Gouraud shading, a divider must be frequently used. An operation speed of the divider is normally low. For example, if the calculations of equations (3) and (6) are performed for each of the points corresponding to the pixels on the scan line, they require a very long time. For this reason, the intensities and Z coordinates of the points are usually obtained using $\Delta I/\Delta X$ and $\Delta Z/\Delta X$. $\Delta I/\Delta X$ represents the change of intensity for each unit change in the X coordinate and is calculated from equations (1) and (2). $\Delta Z/\Delta X$ represents the change of the Z coordinate for each unit change in the X coordinate and is calculated from equations (4) and (5). In this case, the intensity and Z coordinate of each point can be obtained by adding $\Delta I/\Delta X$ and $\Delta Z/\Delta X$ to the intensity and Z coordinate of the point corresponding to the pixel before the unit change in the X coordinate. However, calculations for obtaining changes $\Delta I/\Delta X$ and $\Delta Z/\Delta X$ must be performed for each scan line, and all the calculations still require a long time.

The X and Y coordinates of a pixel whose intensity is to be determined are normally generated by a digital differential analyzer. However, since the operation speed for obtaining changes $\Delta I/\Delta X$ and $\Delta Z/\Delta X$ is low, it is difficult to associate the divider and the digital differential analyzer to achieve pipeline processing.

SUMMARY OF THE INVENTION

It is an object of the present invention to provide a shading circuit which can execute Gouraud shading at high speed.

The shading circuit of the present invention has a preprocessing section for obtaining the depth change $\Delta Z/\Delta X$ of Z coordinate for each unit change in X coordinate and the change $\Delta I/\Delta X$ of intensity for each unit change in X coordinate, based on X, Y, and Z coordinates and intensities of three vertexes of each of triangular polygons constituting a solid model, and a DDA section for obtaining Z coordinates and intensities of points inside each polygon commonly using $\Delta Z/\Delta X$ and $\Delta I/\Delta X$ when the X and Y coordinate of the points are determined.

If a polygon processed in Gouraud shading is a triangle, a surface defined by connecting vertexes is always a plane. Therefore, in the case of the triangular polygon, the change of intensity for each unit change in X coordinate and the change of Z coordinate for each unit change in X coordinate are constant for all the scan lines parallel to X coordinate axis. For this reason, these values are calculated once for a single triangular polygon, and the calculated values are commonly used for all the points inside the polygon, thereby greatly reducing the number of division operations.

DETAILED DESCRIPTION OF THE PREFERRED EMBODIMENT

Figure 2:
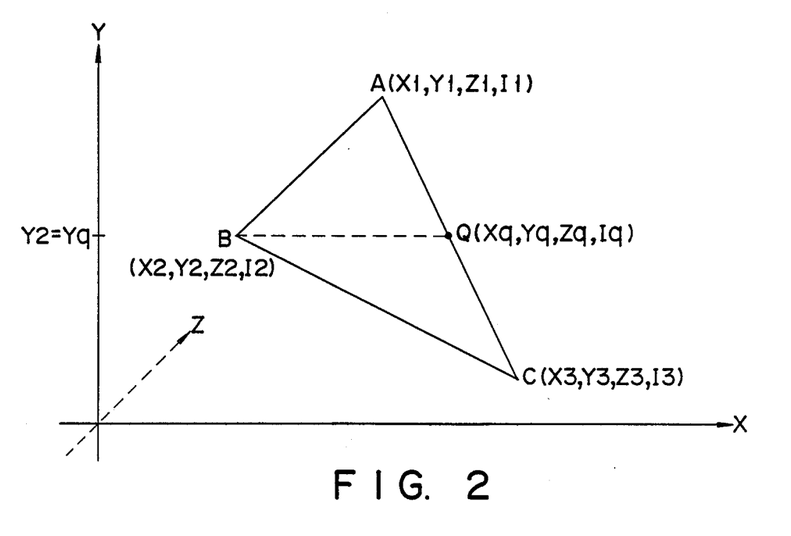
FIG. 2 shows a triangular polygon to be shaded according to an embodiment of the present invention.

An embodiment of the present invention will be described hereinafter with reference to FIG. 2. In this embodiment, triangular polygons are employed to synthesize a solid model. In a shading process of the solid model, vertex data of a plurality of items are prepared for each polygon. FIG. 2 shows one of the triangular plygons. In FIG. 2, $(X1,Y1,Z1,I1)$, $(X2,Y2,Z2,I2)$ and $(X3,Y3,Z3,I3)$ are vertex data prepared for vertexes A, B, and C of this triangular polygon. $(X1,Y1,Z1)$, $(X2,Y2,Z2)$, and $(X3,Y3,Z3)$ are three-dimensional coordinates representing the positions of vertexes A, B, and C of the polygon, and I1, I2, and I3 are intensities or luminances of vertexes A, B, and C of the polygon.

An arithmetic operation necessary for shading the polygon shown in FIG. 2 will be described. In this arithmetic operation, Y coordinates of vertexes A, B, and C are compared to detect a vertex located between two vertexes in the Y coordinate direction. In this case, vertex B is detected. X coordinate Xq, Z coordinate Zq, and intensity Iq of point Q shown in FIG. 2 are then calculated. Point $Q(Xq,Yq,Zq,Iq)$ is located at a position where a line drawn from vertex B in parallel to coordinate axis X intersect side AC connecting vertexes A and C, and values of Xq, Zq, and Iq are obtained by midpoint-subdivision on coordinate values and intensities of vertexes A and C, respectively.

In connection with line segment BQ along a scan line, the change of Z coordinate for each unit change in X coordinate, and the change of intensity for each unit change in X coordinate are obtained by divisions $(Zq-Z2)/(Xq-X2)$ and $(Iq-I2)/(Xq-X2)$, respectively. The triangular polygon as described above has a flat surface. Therefore, the same results can be obtained even if the above calculations are performed for any scan line across the polygon.

For sides AB, BC, and CA of the polygon, the changes of X coordinate for each unit change in Y coordinate are calculated by divisions $(X1-X2)/(Y1-Y2)$, $(X2-X3)/(Y2-Y3)$, and $(X3-X1)/(Y3-Y1)$, respectively. For side AC, the changes of Z coordinate and intensity for each unit change in Y coordinate are obtained by divisions $(Z1-Z3)/(Y1-Y3)$ and $(I1-I3)/(Y1-Y3)$, respectively. The above seven divisions are performed as preprocessing for shading the surface of a single polygon on a display screen, and the results of these divisions ae retained in, e.g., registers.

The division results are used for arithmetic processing for determining intensities of corresponding pixels while scanning the polygons on the display screen. The X and Y coordinates of pixels whose intensity should be determined are generated by using a digital differential analyzer (DDA). In this case, the polygon is scanned from vertex C toward vertex A in a direction parallel to coordinate axis X, and Z coordinates and intensity of points inside the polygon are obtained in accordance with the X and Y coordinates. More specifically, the Z coordinates and intensity of points inside the polygon are obtained in each scan line in accordance with the X coordinates of pixels. The intensities of pixels on the display screen are determined based on the Z coordinates and intensities of points inside the polygon, and the shaded polygon is displayed in practice.

In the polygon shown in FIG. 2, the intensity determining operation for the pixels on each scan line is performed from the side AC. Whether the direction of the intensity determining operation corresponds to right or left along the scan line is determined by comparing values of Xq and X2. More specifically, when the value of Xq is greater than that of X2, the operation is performed in the direction from right to left. When the value of Xq is smaller than that of X2, it is performed in the direction from left to right.

Figure 3:
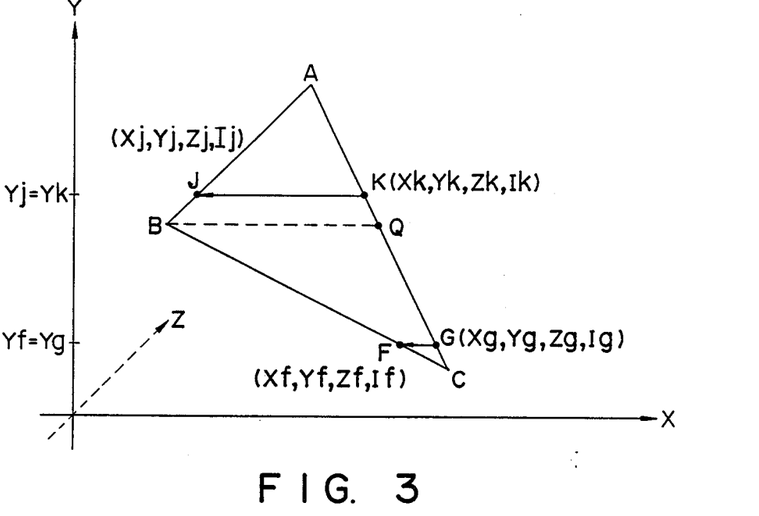
FIG. 3 is a view for explaining a method for obtaining a Z coordinate and an intensity of a point inside the triangular polygon shown in FIG. 2.

While the polygon is scanned from vertex C to line segment BQ, the Z coordinates and intensities of points corresponding to the pixels which are on the scan lines, are obtained as follows. After vertex C is first scanned, the Y coordinate of the scan line is incremented by a unit to scan the polygon along the next scan line, whihc is located above the scan line by one line. When the intensities of pixels on this scan line are determined, X coordinates Xf and Xg of points F and G are first calculated. Points $F(Xf,Yf,Zf,If)$ and point $G(Xg,Yg,Zg,Ig)$ are points where this scan line intersects sides BC and CA of the polygon. X coordinates Xf and Xg of points F and G can be calculated by the following equations:

$$Xf = X3 + (X2-X3)/(Y2-Y3) \qquad (7)$$

$$Xg = X3 + (X1-X3)/(Y1-Y3) \qquad (8)$$

Z coordinate Zg and intensity Ig of point G are then calculated. Z coordinate Zg and intensity Ig are calculated by the following equations:

$$Zg = Z3 + (Z1-Z3)/(Y1-Y3) \qquad (9)$$

$$Ig = I3 + (I1-I3)/(Y1-Y3) \qquad (10)$$

Then, the number of pixels (i.e., the number of unit changes in X coordinate) is calculated along this line segment FG. The number of pixels is calculated based on X coordinates Xg and Xf of points G and F. When the intensities of the pixels are determined from point G toward point F, the Z coordinates and intensities of points inside the polygon are calculated as follows. More specifically, the Z coordinates and the intensities of the points inside the polygon can be calculated by sequentially adding, to Z coordinate Zg and intensity Ig of the scan start point, i.e., point G, the change (Zq−Z2)/(Xq−X2) of Z coordinate for each unit change in X coordinate and the change (Iq−I2)/(Xq−X2) of intensity for each unit change in X coordinate.

The Y coordinate of the scan line is sequentially incremented by the unit, so that the polygon is sequentially scanned to line segment BQ. In this manner, small triangle BCQ is shaded.

The polygon is further scanned from line segment BQ toward vertex A in a direction parallel to coordinate axis X. In this case, the X coordinate of a point on side AB is calculated using (X1−X2)/(Y1−Y2) which represents the change of X coordinate for each unit change in Y coordinate.

When the scan line is located above a scan line intersecting points B and Q by one line, and the intensity of pixels on this scan line are determined, X coordinates Xj and Xk of points J and K are first calculated. Points J(Xj,Yj,Zj,Ij) and K(Xk,Yk,Zk,Ik) are points where this scan line intersects sides AB and AC, respectively. X coordinates Xj and Xk of points J and K are calculated by the following equations:

$$Xj = X2 + (X1-X2)/(Y1-Y2) \quad (11)$$

$$Xk = Xq + (X1-X3)/(Y1-Y3) \quad (12)$$

Then, Z coordinate Zk and intensity Ik of point K and the number of pixels along line segment JK are calculated in the same manner as described above. The intensities of pixels are determined from point K toward point J, and the Z coordinates and intensities of points corresponding to the pixels are calculated by the same addition as described above. The Y coordinate of the scan line is sequentially incremented by the unit, and the Z coordinates and intensities of points inside the polygon along the corresponding scan line are obtained accordingly. After the polygon is scanned up to vertex A, shading of small triangle ABQ is completed.

Figure 4:
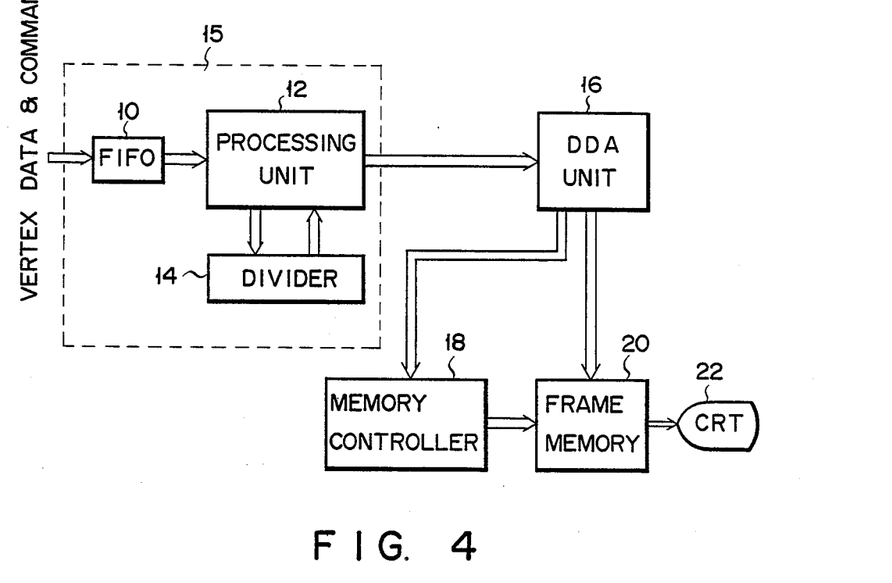
FIG. 4 is a block diagram showing an arrangement of a shading circuit according to an embodiment of the present invention.

FIG. 4 is a block diagram showing a shading circuit for realizing the above-mentioned processing. The schematic arrangement of the shading circuit will now be described. The shading circuit has FIFO buffer 10, processing unit 12, and divider 14, as preprocessing section 15. Buffer 10 receives vertex data of triangular polygons and various commands, for example, from a keyboard (not shown), and supplies these data to processing unit 12. Processing unit 12 executes the predetermined processing based on the vertex data, and various control operations. Divider 14 executes various divisions designated by processing circuit 12. The shading circuit further has digital differential analyzer unit 16, memory controller 18, and frame memory 20. Unit 16 receives vertex data and the calculation results from processing unit 12. Unit 16 sequentially generates linear address signals, which represent X and Y coordinates of the pixels assigned to points forming a polygon and intensities and Z coordinates of the points X and Y coordinates of each pixel, are supplied from unit 16 to memory controller 18. Intensity and Z coordinate of each pixel are supplied from unit 16 to frame memory 20. Frame memory 20 has a plurality of memory locations and stores intensity and Z coordinate of a pixel in the memory locations designated by control of controller 18. The contents of memory 20 are periodically supplied to display 22.

Figure 5:
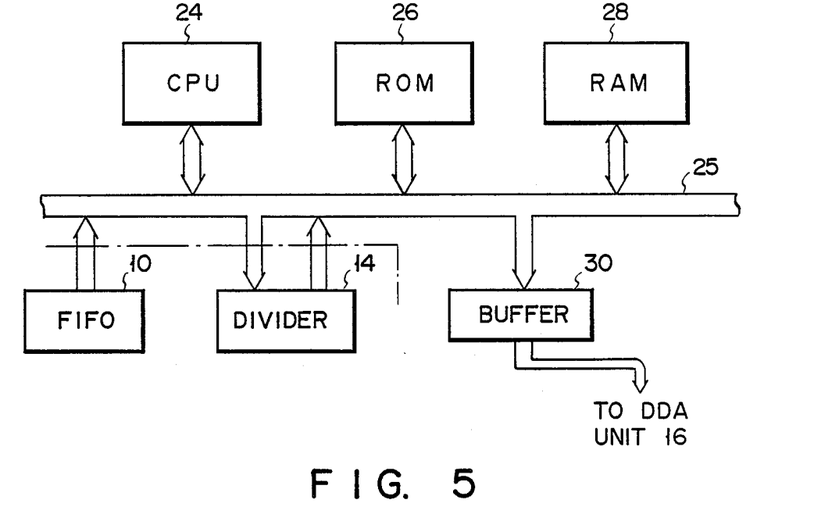
FIG. 5 is a view showing in detail an arrangement of a processing unit shown in FIG. 4.

FIG. 5 shows the arrangement of processing unit 12. Processing unit 12 has CPU 24, ROM 26, RAM 28, and buffer 30, which are connected to each other through common bus 25. Bus 25 includes address lines, data lines and control lines. ROM 26 stores a control program for CPU 24. Instructions of this program are sequentially supplied to CPU 24 through bus 25. CPU 24 executes various control operations and calculations in accordance with the instructions. RAM 28 temporarily stores input/output data to/from CPU 24. When vertex data of the triangular polygon is supplied from FIFO buffer 10 to CPU 24, CPU 24 processes the data using divider 14, and supplied the processed data to buffer 30.

Figure 6:
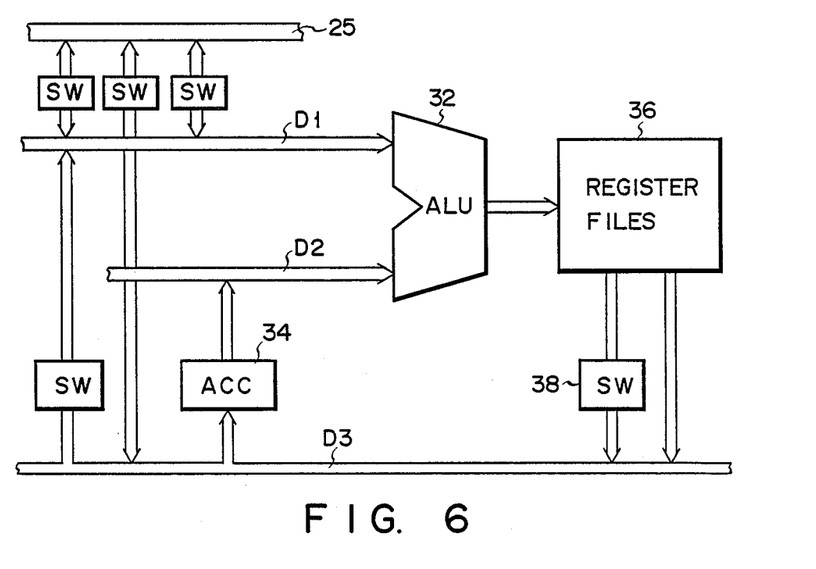
FIG. 6 is a view showing in detail an arrangement of a CPU shown in FIG. 5.

FIG 6 shows the schematic arrangement of CPU 24. CPU 24 has ALU 32, accumulator 34, and register files 36. ALU 32 has X and Y input ports connected to internal buses D1 and D2, and can execute an arithmetic-logic operation of 32-bit data. Register files 36 receive and temporarily store data output from ALU 32. Register files 36 have two 16-bit output ports, the upper order output port of which is directly connected to internal bus D3, and the lower order output port of which is connected to internal bus D3 through switch circuit 38. Accumulator 34 has a shift function, and is inserted between internal buses D3 and D2. Internal buses D1, D2, and D3 are connected to common bus 25 through switch circuits, respectively.

Figure 7A:
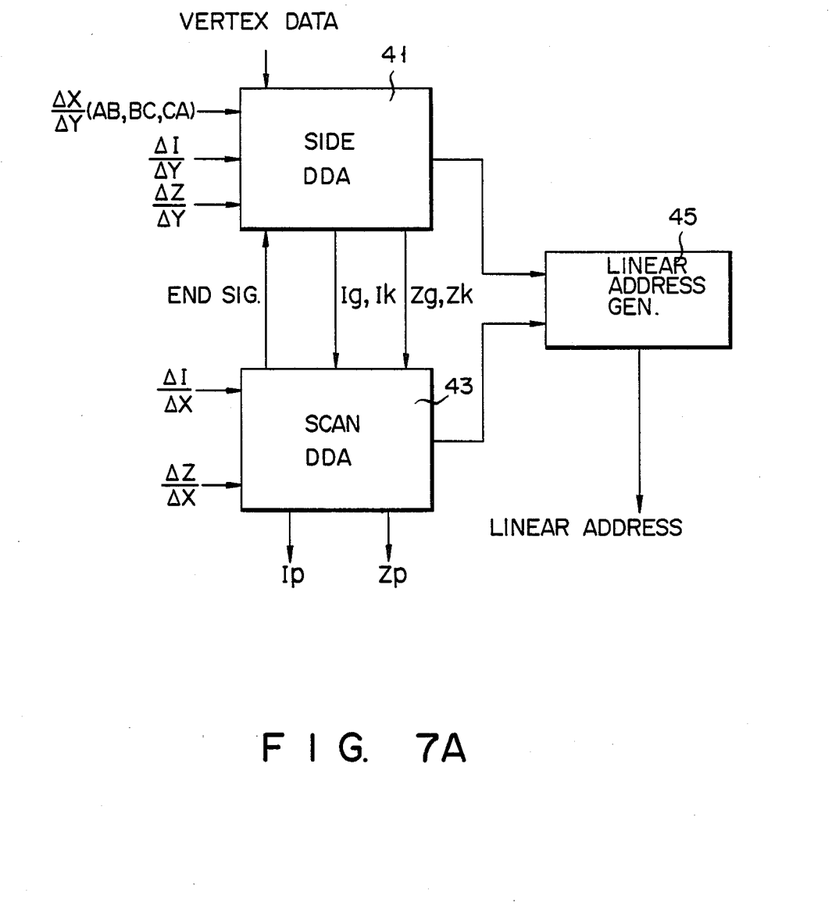
FIGS. 7A and 7B show the detailed structure of a DDA unit shown in FIG. 4.

FIG. 7A is a block diagram of the DDA unit shown in FIG. 4. DDA unit 16 includes a side DDA 41, a scan DDA 43, and an address generator 45. DDAs 41 and 43 are connected to CPU 24 via buffer 30. DDA 41 sequentially specifies Y coordinates as scan lines and obtains the starting intensity and Z coordinate for each scan line. DDA 43 sequentially specifies X coordinates along the scan line specified by DDA 41 and obtains an intensity and Z coordinate for each pixel on the scan line. Address generator 45 is supplied with X and Y coordinates from DDA 43 and 41, respectively. This X and Y coordinates are combined in generator 45 and supplied therefrom to controller 18 as a linear address signal.

Figures 7B, 8:
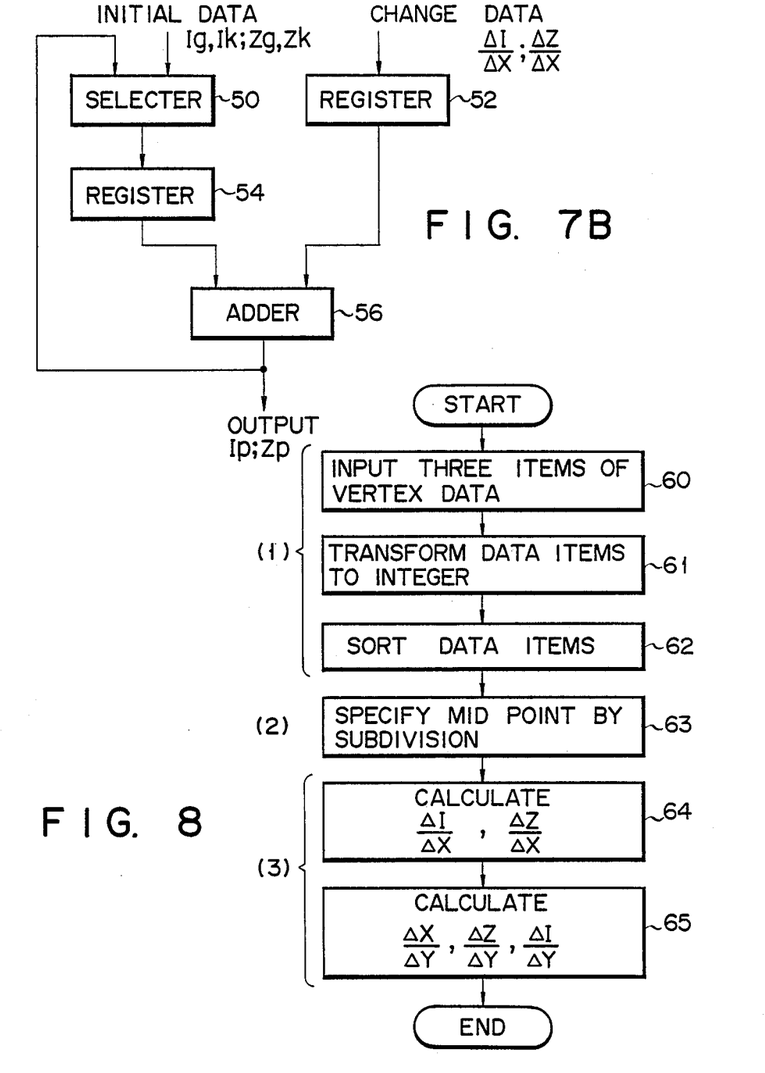
FIGS. 8, 9, and 10 are views for explaining the operation of the shading circuit shown in FIG. 4.

Scan DDA 43 includes two calculating sections for obtaining an intensity and Z coordinate, respectively. These calculating sections have the same structure as shown in FIG. 7B. Each calculating section comprises selector 50, register 52, register 54, and adder 56. In the section, initial data (i.e., the starting intensity or the starting z coordinate) is stored in register 54 through selector 50, while change data (i.e., the change of intensity for each unit change in X coordinate or the change of Z coordinate for each unit change in X coordinate) is stored in register 52. These data are added by adder 56, and the sum data is output. Thereafter, the output data from adder 56 is stored in register 54 through selector 50. Change data is added to the content of register 54 by adder 56, and the sum data is output. The output data from adder 56 is stored in register 54 through selector 50. This operation is repeated a required number of times.

Figure 9:
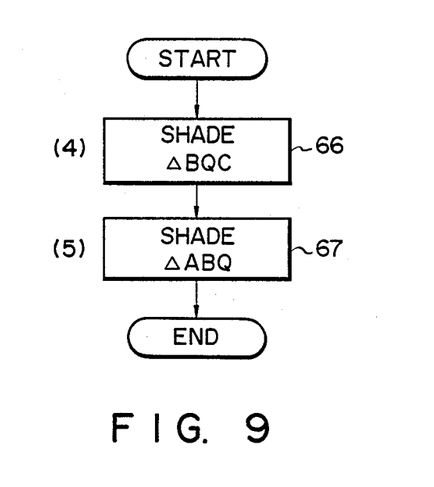
Figure 10:
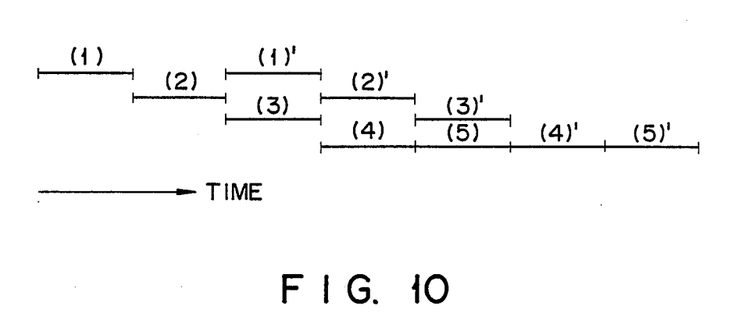

The operation of the shading circuit will now be described with reference to FIGS. 8 to 10. FIG. 8 is a flow chart of processing unit 12, FIG. 9 is a flow chart of DDA unit 16, and FIG. 10 shows timings of execution of steps shown in FIGS. 8 and 9. Assume that a triangular polygon shown in FIG. 2 is shaded. Processing unit 12 receives vertex data of vertexes A, B, and C of the polygon, i.e., (X1,Y1,Z1,I1), (X2,Y2,Z2,I2), and (X3,Y3,Z3,I3) through FIFO buffer 10, in step 60. The X, Y, Z coordinates and the intensities of the vertex data are shifted toward the MSBs by 16 bits and transformed to integers. In step 61, CPU 24 sorts the Y coordinates of vertex data in the descending order. In step 62, the X and Z coordinates and the intensity of point Q shown in FIG. 2 are calculated by the midpoint subdivision method. In step 64, CPU 24 causes divider 14 to calculate $\Delta Z/\Delta X$ and $\Delta I/\Delta X$ for line segment BC. $\Delta I/\Delta X$ is the change of intensity for each unit change in X coordinate, and $\Delta Z/\Delta X$ is the change of Z coordinate for each unit change in X coordinate. In steps 65, CPU 24 causes divider 14 to calculate $\Delta X/\Delta Y$ for each of sides AB, BC, and CA of the polygon. $\Delta X/\Delta Y$ is the change of X coordinate for each unit change in Y coordinate. In step 65, CPU 23 causes divider 14 to calculate $\Delta Z/\Delta Y$ and $\Delta I/\Delta Y$ for side AC. $\Delta Z/\neq Y$ is the change of Z coordinate for each unit change in Y coordinate. $\Delta I/\Delta Y$ is the change of intensity for each unit change in the Y coordinate. In steps 64 and 65, the division results are supplied to registers of DDA unit 16, and memory controller 18 instructs frame memory 20 to store the output data from DDA unit 16. In step 66, DDA unit 16 calculates the Z coordinates and intensities of points inside triangle BCQ as pixels on the display screen, and supplies the results to frame memory 20. In step 67, DDA unit 16 calculates the Z coordinates and intensity of points inside triangle ABQ as pixels on the display screen, and supplies the results to frame memory 20. On step 66 and 67, change data $\Delta I/\Delta X$ and $\Delta Z/\Delta X$ are continuously stored in registers 52 of the calculating sections of scan DDA 43 and are utilized for obtaining intensities and Z coordinates of points corresponding to the pixels on each scan line.

When all the polygons constituting the solid model are to be shaded, the operations shown in FIGS. 8 and 9 are repeated a plurality of times corresponding in number to these polygons. In this case, operations (1) to (5) associated with the first polygon overlap operations (1)' to (5)' associated with a second polygon, as shown in FIG. 10.

In the shading circuit of this embodiment, the processing operation in the preprocessing section 15 and that in DDA unit 16 can be completely separated, and hence, parallel pipeline processing can be achieved. More specifically, when processing for an immediately preceding polygon is performed by DDA unit 16, calculations of the above-mentioned seven values can be performed by preprocessing section 15, thus realizing high-speed processing. In particular, paying attention to divider 14, in the conventional method, each three divisions for calculating $\Delta X/\Delta Y$, $\Delta I/\Delta Y$, and $\Delta Z/\Delta Y$, i.e., a total of nine divisions are required in the case of a triangular polygon. In addition, if the number of scan lines is given as n, each n divisions for calculating $\Delta Z/\Delta X$ and $\Delta I/\Delta X$ are required for every Y coordinate. Therefore, in the conventional method, (9+n) divisions are necessary. In contrast to this, in the shading circuit of the present invention, only 7 divisions are performed for each triangular polygon. In general, since divisions require a long operation time, a decrease in the number of times of divisions can provide great practical advantages.

In the shading circuit shown in FIG. 4, since the processing operation in DDA unit 16 determines the operations speed of the overall circuit, single divider 14 for obtaining the above-mentioned seven values can commonly be used for respective calculations. Thus, a circuit size can be reduced.

The present invention is not limited to the above embodiment, and various changes and modifications may be made within the spirit and scope of the invention. For example, in the above description, the midpoint subdivision method is employed as a method for calculating point Q. Instead, X and Z coordinates and intensity of point Q having a Y2 coordinate on side AC may be calculated using values of (X1-X3)/(Y1-Y3), (Z1-Z3)/(Y1-Y3), (I1-I3)/(Y1-Y3) and the DDA processing scheme.

Another embodiment of the present invention will be described with reference to the accompanying drawings. In this embodiment, a polygon to be shaded is limited to a triangle, and as shown in FIG. 2, three-dimensional coordinates (X,Y,Z) and intensities (I) are respectively given to vertexes A, B, and C of the triangular polygon. The rates of change in intensity and depth coordinate with respect to X coordinate are calculated using a constant Y coordinate, i.e., along a scan line parallel to the X coordinate axis. These values can be analytically calculated and can be expressed as follows:

$$(\Delta Z/\Delta X)(Y:\text{constant}) = \{(Y1-Y2)(Z2-Z3) - (Y2-Y3)(Z1-Z2)\}/\{(Y1-Y2)(X2-X3) - (Y2-Y3)(X1-X2)\} \quad (13)$$

$$(\Delta I/\Delta X)(Y:\text{constant}) = \{(Y1-Y2)(I2-I3) - (Y2-Y3)(I1-I2)\}/\{(Y1-Y2)(X2-X3) - (Y2-Y3)(X1-X2)\} \quad (14)$$

When the polygon is a triangle, the above-mentioned values are common to all the scan lines. For sides AB, BC, and CA, three rates of changes in X coordinate with respect to the Y coordinate, i.e., (X1-X2)/(Y1-Y2), (X2-X3)/(Y2-Y3), and (X3-X1)/(Y3-Y1), are obtained. In addition, for sides AB, BC, and CA, a total of six rates of changes in intensity and depth coordinate with respect to the Y coordinate, i.e., three kinds of ($\Delta I/\Delta Y$) and three kinds of ($\Delta Z/\Delta Y$), are similarly obtained. Of these ratios, a maximum of four kinds are used for shading. The calculation values of equations (13) and (14), the three types of ratios ($\Delta X/\Delta Y$) and a maximum of four kinds of ratios ($\Delta I/\Delta Y$) and ($\Delta Z/\Delta Y$), i.e., seven kinds of division values, are retained, and shading processing is executed. For example, Z coordinates and intensities of points inside the polygon with respect to X coordinates of pixels are calculated while scanning the polygon from side AB along the X coordinate axis. For example, assume that the polygon is sequentially scanned from vertex B toward vertex A in parallel with coordinate axis X. When the Y coordinate is incremented by a unit coordinate to scan a line above the current line by one line, X coordinates of points J and K at which this scan line respectively intersects sides AB and AC can be calculated by addition. More specifically, X coordinates Xf and Xg of points F and G can be calculated by:

$$Xf = X2 + (X1-X2)/(Y1-Y2)$$

$$Xg = X2 + (X1-X3)/(Y1-Y3)$$

Similarly, Z coordinates Zj and intensity Ij of point J can be calculated by:

$$Zj = Z2 + (Z1-Z2)/(Y1-Y2)$$

$Ij=I2+(I1-I2)/(Y1-Y2)$

The number of pixels on a scan line defined by line segment JK parallel to the X axis can be calculated from Xj and Xk, and Z coordinates and intensity I corresponding to pixels on the scan line can be obtained by sequentially adding ($\Delta Z/\Delta X$) (Y:constant) and ($\Delta I/\Delta X$) (Y:constant) to Z coordinate Zj and intensity Ik of the scan start point. In this manner, the Y coordinate is sequentially incremented by a unit coordinate to sequentially update the scan line, and shading processing for a single triangle polygon is completed. At this time, it is important that two values of ($\Delta Z/\Delta X$) (Y:constant) and ($\Delta I/\Delta X$) (Y:constant) are constant.

Figure 11:
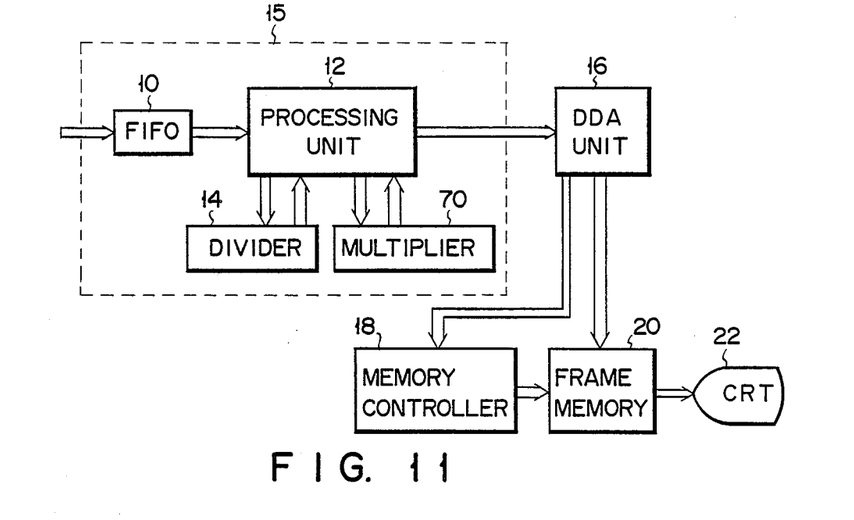
FIG. 11 is a view showing an arrangement of a shading circuit according to a second embodiment of the present invention.

FIG. 11 is a block diagram showing a shading circuit according to a second embodiment similar to the first embodiment. The shading circuit shown in FIG. 11 includes preprocessing section 15 as a geometric transformation section for performing primary transformation processing on each polygon. Primary transformation processing such as coordinate transformation, enlargment, reduction, and the like are performed based on vertex data items. The shading circuit includes a shading section for writing data into frame memory 20 in a shading process. Geometric transformation section 15 executes primary transformation processing such as matrix multiplication, using multiplier 70. Multiplier 70 can perform arithmetic operations such as multiplication, addition, subtraction, and the like to execute the above processing. In this invention, geometric transformation section 15 also has a divider, which can be used for executing multiplication, addition. Therefore, ($\Delta Z/\Delta X$) (Y:constant) and ($\Delta I/\Delta X$) (Y:constant) represented by equations (13) and (14) and seven kinds of division values are calculated by geometric transformation section 15, and the results are supplied to the DDA unit 16 of the shading section.

Figure 12:
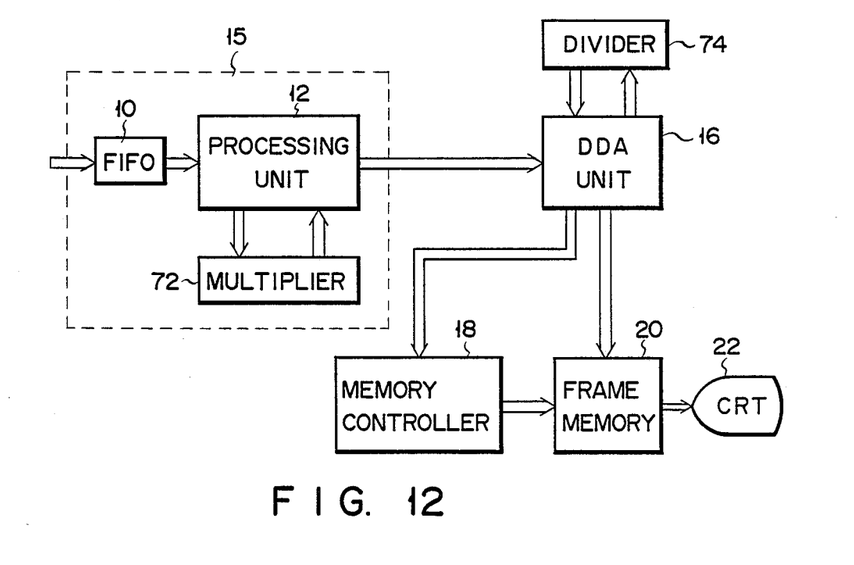
FIG. 12 is a view showing an arrangement of a shading circuit according to a third embodiment of the present invention.

As a shading circuit according to a third embodiment simular to the second embodiment, values of numerators and denominators of equations (13) nd (14) are respectively calculated by geometric transformation section 15 using the multiplication, addition, and subtraction functions of multiplier 70 and the calculated values of the numerators and denominators are supplied to DDA unit 16 to calculate values of ($\Delta Z/\Delta X$) (Y:constant) and ($\Delta I/\Delta X$) (Y:constant) and seven kinds of division values using the divider 74 of the shading section.

As can be understood from the embodiments of the present invention, since a triangular polygon is employed, ($\Delta Z/\Delta X$) (Y:constant) and ($\Delta I/\Delta X$) (Y:constant) can be used as constants in a triangle. Therefore, the number of times of divisions can be reduced as compared to a conventional method. In addition, since shading processing for a given triangle and calculation processing of depth Z coordinates and intensities of the next triangle can be executed in a parallel pipeline manner, high-speed operation can be realized. When the above two values are calculated, hardware (multiplier, ALU) of a geometric transformation section can be effectively utilized, and a divider of a shading section can also be effectively utilized. In addition, since the Z coordinates can be analytically obtained, processing can be performed at higher speed than successive approximation, and precision of the calculated value can be assured. The data processing in the geometric transformation section and that in the shading processing section can be well balanced, and a performance as an graphic processing system can be improved. Since hardware can be saved, the geometric transformation section and the shading processing section can be easily constituted by LSIs (one to several chips). When the divider is included in either the geometric transformation section or the shading section, overall processing performance can be improved in accordance with processing power of the respective sections in the apparatus.

What is claimed is:

1. A shading circuit for shading a plurality of triangular polygons which constitute a solid model to be displayed on a screen defined by X, Y and Z coordinate axes, each orthogonal to the other, comprising:

preprocessing means including means for receiving three vertex data, each containing the intensity and X, Y, and Z coordinates of a corresponding vertex of a corresponding one of the plurality of triangular polygons, and means for defining two points at which a selected one of a plurality of scan lines disposed substantially parallel to the X coordinate axis intersects a corresponding one of the polygons, obtaining the intensity and Z coordinate corresponding to each of said two points, and obtaining a unit change $\Delta I/\Delta X$ of intensity with respect to each unit change of the X coordinate axis and a unit change $\Delta Z/\Delta X$ of the Z coordinate axis with respect to each unit change of the X coordinate axis, based on the intensities and Z coordinates of said two points; and shading section, responsive to said received three vertex data and the obtained changes $\Delta I/\Delta X$ and $\Delta Z/\Delta X$, for sequentially obtaining the intensity and Z coordinate corresponding to each of a plurality of points disposed on a selected one of the sides of a corresponding one of the polygons to define a starting intensity and Z coordinate for a corresponding one of said scan lines, and for sequentially obtaining the intensity and Z coordinate of each of a plurality of points disposed inside a corresponding one of the polygons on a corresponding one of the scan lines, based on the corresponding starting intensity and Z coordinate thereof and the obtained changes $\Delta I/\Delta X$ and $\Delta Z/\Delta X$.

2. A shading circuit according to claim 1, wherein said preprocessing means includes processing means for determining that one of said two points corresponds to one of the three vertexes having an intermediate Y coordinate value with respect to the Y coordinates of the other two of the three vertexes of a corresponding one of the polygons for obtaining the intensity and Z coordinate of the other one of said two points based on said intermediate Y coordinate value, and for obtaining the changes $\Delta Z/\Delta X$ based on the intensities and Z coordinates of said two points.

3. A shading circuit according to claim 2, wherein said preprocessing means includes a divider circuit for dividing the difference between the intensities of said two points by the difference between the X coordinates of said two points to obtain the change $\Delta I/\Delta X$, and for dividing the difference between the Z coordinates of said two points by the difference between the X coordinates of said two points to obtain the change $\Delta Z/\Delta X$.

4. A shading circuit according to claim 3, wherein said shading section includes a side DDA for sequentially obtaining the intensity and Z coordinate of each of a plurality of points disposed on one of the sides of a corresponding one of the polygons opposite to one of the three vertexes of the corresponding polygon having the intermediate Y coordinate value.

5. A shading circuit according to claim 4, wherein said shading section includes a scan DDA for receiving an intensity and a Z coordinate and or sequentially accumulating the change $\Delta I/\Delta X$ to the received intensity and the change $\Delta Z/\Delta X$ to the received Z coordinate to obtain the intensity and Z coordinate of each of a plurality of points disposed inside a corresponding one of the polygons on a corresponding scan line.

6. A shading circuit according to claim 5, wherein said preprocessing means and shading section cooperatively perform a pipeline processing for said plurality of the triangular polygons.

7. A method for shading a plurality of triangular polygons which constitute a solid model to be displayed on a screen defined by X, Y and Z coordinate axis, each orthogonal to the other, comprising:
 a first step of preparing three vertex data, each containing the intensity and X, Y, and Z coordinates of a corresponding vertex of a corresponding one of the triangular polygons;
 a second step of defining two points at which a selected one of a plurality of scan lines disposed substantially parallel to the X coordinate axis intersects a corresponding one of the polygons and obtaining the intensity and Z coordinate corresponding to each of said two points based on said three vertex data;
 a third step of obtaining a unit change $\Delta I/\Delta X$ of intensity with respect to each unit change of the X coordinate axis and a unit change $\Delta Z/\Delta X$ of the Z coordinate axis with respect to each unit change of the X coordinate axis based on the intensities and Z coordinates of said two points; and
 a fourth step of sequentially obtaining the intensity and Z coordinate corresponding to each of a plurality of points disposed on a selected one of the sides of a corresponding one of the polygons to define a starting intensity and Z coordinate for for a corresponding one of said scan lines, based on the three vertex data, and sequentially obtaining intensity and Z coordinate of each of a plurality of points disposed inside a corresponding one of the polygons on a corresponding one of the scan lines, based on the corresponding starting intensity and Z coordinate thereof and the obtained changes $\Delta I/\Delta X$ and $\Delta Z/\Delta X$.

8. A method for shading a plurality of triangular polygons which constitute a solid model to be displayed on a screen defined by X, Y and Z coordinate axis, each orthogonal to the other, comprising:
 a first step of preparing three vertex data, each containing the intensity and X, Y, and Z coordinates of a corresponding vertex of a corresponding one of the triangular polygons;
 a second step of obtaining a unit change $\Delta I/\Delta X$ of intensity with respect to each unit change of the X coordinate axis and a unit change $\Delta Z/\Delta X$ of the Z coordinate axis with respect to each unit change of the X coordinate axis, based on the following equations:

$(\Delta I/\Delta X)Y$:
 constant = $\{(Y1-Y2)(I2-I3)-(Y2-Y3)(I1-I2)\}/\{(Y1-Y2)(X2-X3)-(Y2-Y3)(X1-X2)\}$ $(\Delta Z/\Delta X)Y$:
 constant = $\{(Y1-Y2)(Z2-Z3)-(Y2-Y3)(Z1-Z2)\}/\{(Y1-Y2)(X2-X3)-(Y2-Y3)(X1-X2)\}$ where X1, X2, and X3 are respectively the X coordinates of three vertexes A, B, and C of a corresponding one of the polygons; Y1, Y2, and Y3 are respectively the Y coordinates of vertexes A, B, and C; Z1, Z2, and Z3 are respectively the Z coordinates of vertexes A, B, and C; and I1, I2, and I3 are respectively the intensities of vertexes A, B, and C; and
 a third step of sequentially obtaining the intensity and Z coordinate corresponding to each of a plurality of points disposed on a selected one of the sides of a corresponding one of the polygons to define a starting intensity and Z coordinate for a corresponding one of the scan lines disposed substantially parallel to the X coordinate axis, based on the three vertex data, and sequentially obtaining the intensity and Z coordinate of each of a plurality of points disposed inside a corresponding one of the polygons on a corresponding one of the scan lines, based on the corresponding starting intensity and Z coordinate and the obtained changes $\Delta I/\Delta X$ and $\Delta Z/\Delta X$.

9. A shading method according to claim 8, wherein said second step includes a first substep of obtaining said changes $\Delta I/\Delta X$ and $\Delta Z/\Delta X$, a second substep of obtaining the change $\Delta X/\Delta Y$ of X coordinate for each unit change in Y coordinate, with respect to each of vertexes A, B, and C, and a third substep of obtaining the change $\Delta I/\Delta Y$ of intensity for each unit change in Y coordinate and the change $\Delta Z/\Delta Y$ of Z coordinate for each unit change in Y coordinate, with respect to at most two of vertexes A, B, and C, said first, second and third substeps being performed with a use of a multiplier, ALU, and divider which are contained in a geometric transformation circuit.

10. A shading method according to claim 8, wherein said second step includes a first substep of obtaining numerators and denominators of each of said two equations, using a multiplier and ALU, which are contained in a geometric transformation circuit, and a second substep of obtaining said changes $\Delta I/\Delta X$ and $\Delta Z/\Delta X$ based on the numerators and denominators of said equations, a third substep of obtaining the change $\Delta X/\Delta Y$ of X coordinate for each unit change in Y coordinate, with respect to each of vertexes A, B, and C, and a fourth substep of obtaining the change $\Delta I/\Delta Y$ of intensity for each unit change in Y coordinate and the change $\Delta Z/\Delta Y$ of Z coordinate for each unit change in Y coordinate, with respect to at most two of vertexes A, B, and C, said second, third and fourth substeps being performed with a use of a divider which is contained in a shading section.

* * * * *

UNITED STATES PATENT AND TRADEMARK OFFICE
CERTIFICATE OF CORRECTION

PATENT NO. : 4,862,391

DATED : August 29, 1989

INVENTOR(S) : Masahide Ohhashi

It is certified that error appears in the above-identified patent and that said Letters Patent is hereby corrected as shown below:

Claim 7, Column 11, Line 41, "coordinate for for" should be --coordinate for--.

Signed and Sealed this

Ninth Day of June, 1992

Attest:

DOUGLAS B. COMER

Attesting Officer

Acting Commissioner of Patents and Trademarks